(12) United States Patent
Kuehnl et al.

(10) Patent No.: US 6,308,544 B1
(45) Date of Patent: Oct. 30, 2001

(54) VEHICLE BODY COMPONENT WITH A TIN/ZINC COATING

(75) Inventors: Walter Kuehnl, Hucke; Dieter Mauer, Lollar; Reinhold Opper, Alten-Buseck, all of (DE)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 09/235,411

(22) Filed: Jan. 22, 1999

(30) Foreign Application Priority Data

Jan. 22, 1998 (DE) .......................................... 298 01 049 U

(51) Int. Cl.⁷ ........................................................ B21K 1/44
(52) U.S. Cl. ........................ 72/27; 72/8; 72/18; 205/154; 205/252
(58) Field of Search .................................. 470/27, 28, 34, 470/8, 18; 428/646, 658, 659, 935; 205/149, 151, 154, 252; 427/406

(56) References Cited

U.S. PATENT DOCUMENTS

| | | |
|---|---|---|
| 3,857,684 | 12/1974 | Kubu . |
| 4,184,928 | 1/1980 | Hoije . |
| 4,508,601 | 4/1985 | Nemoto et al. . |
| 4,910,095 | 3/1990 | Izaki et al. . |
| 5,033,181 * | 7/1991 | Lat et al. ............................... 29/433 |
| 5,082,536 | 1/1992 | Izaki et al. . |
| 5,178,903 * | 1/1993 | Lat et al. ............................... 427/446 |
| 5,378,346 * | 1/1995 | Ashinu et al. ........................ 205/244 |
| 5,429,882 | 7/1995 | Carey, II et al. . |
| 5,489,490 | 2/1996 | Carey, II et al. . |
| 5,712,049 * | 1/1998 | Huhn et al. ........................... 428/646 |
| 5,989,735 * | 11/1999 | Ruimi et al. .......................... 428/658 |

FOREIGN PATENT DOCUMENTS

| | | |
|---|---|---|
| 29 35 401 B1 | 6/1980 | (DE) . |
| 38 19 495 C1 | 11/1989 | (DE) . |
| 195 19 866 A1 | 12/1996 | (DE) . |
| 59-129783 | 7/1984 | (JP) . |
| 59-023859 | 11/1984 | (JP) . |
| 62-013592 | 1/1987 | (JP) . |
| 59-200789 | 7/1989 | (JP) . |
| 59-129781 | 9/1993 | (JP) . |

OTHER PUBLICATIONS

Everhart, J. L., "Properties Of Tin And Tin Alloys," Metals Handbook, 8th Ed., vol. 1, Properties and Selection of Metals., pp. 1142–1146.

"Crystal Defects," McGraw–Hill Encyclopedia Of Science & Technology, 6th Ed., 4 CLI–CYT, p. 570.

Van Vlack, L. H. and Reed–Hill, Robert E., "Alloy," McGraw–Hill Encyclopedia Of Science & Technology, 6th Ed., pp. 369–372.

Thomson R.M., "Alloy Structures," McGraw–Hill Encyclopedia Of Science & Technology, 6th Ed., pp. 372–378.

Schlötter Galvanotechnik Technical Bulletin, "Zink/ZinnLegierungsbad: Slotoloy ZSN 10 [Zinc/Tin Alloy Bath: Slotoloy ZSN 10]," pp. 1–4 (Jan. 27, 1998) with translation.

Volkswagen AG Corporate Standard, "Ternäre Kompositschicht für hochfeste Verbindungselemente [Ternary Composite Coating for High–Strength Connecting Elements]" (Feb. 1995) with translation.

* cited by examiner

Primary Examiner—Ed Tolan
(74) Attorney, Agent, or Firm—Harness, Dickey & Pierce, P.L.C.

(57) ABSTRACT

The invention relates to a coated metal fastener that is prepared by electrogalvanically coating a metal fastener with a layer of tin and zinc mixed crystals, wherein the tin is from about 50 to about 90% by weight of the mixed crystals layer. The fastener plated with the tin and zinc alloy layer has a number of unexpected properties, including stability at higher temperatures than expected, which is important for retaining the strength of a vehicle joint secured with the fastener during subsequent finishing operations; retention of electrical conductivity, which makes the fastener suitable for use as a grounding member; and resistance to galvanic corrosion when the fastener joins metals of differing electrode potential.

21 Claims, 2 Drawing Sheets

VEHICLE BODY COMPONENT WITH A TIN/ZINC COATING

FIELD OF THE INVENTION

The invention relates to a component with at least one coating containing at least tin and zinc.

It is known that, for reducing a transition resistance between two electrically conductive parts, at least one part is provided with a tin coating. Such components are, for example, solid bolts welded on a body structure of a motor vehicle. With the introduction of water-soluble paints, solid bolts with tin or tin-containing layers are no longer used. The reason for this is that water-soluble paints are dried at a temperature of about 300° C. This drying temperature lies above the melting temperature of the tin of 231.89° C. Drying of a water-soluble paint at about 300° C. therefore destroys the coating.

BACKGROUND AND SUMMARY OF THE INVENTION

It is also known to provide components with a tin/zinc coating, the tin and zinc being in powder form and being applied mechanically to the component. A component of this type is a self-punching semitubular rivet which is used as a connecting element for forming a body structure. The risk also arises that, at the high temperatures which occur during the drying of a water-soluble paint, the tin/zinc coating will experience a change which can lead to a change in the strength of the joint. In particular when such components are used for body structures in the region critical for safety, a change to the strength of the joint is unacceptable.

On the basis of the foregoing, the object of the present invention is to provide a component with at least one coating which contains at least tin and zinc, in which the coating remains stable even at elevated temperatures, in particular at a temperature of about 300° C.

According to the invention, this object is achieved with a component coated with a layer of tin and zinc mixed crystals, in which the tin is from about 50 to about 90% by weight of the mixed crystals layer.

DETAILED DESCRIPTION OF THE INVENTION

The component according to the invention comprises at least one coating containing at least tin and zinc. The coating comprises tin and zinc mixed crystals. The component is a vehicle body component. Owing to the design of the coating according to the invention, the coating remains stable even at elevated temperatures, in particular at a temperature of about 300° C. It has surprisingly been found that the tin and zinc mixed crystals, tin and zinc being connected to one another at the boundaries, have a melting temperature above the melting temperature of the tin. It is therefore possible to use the components coatece in this way in positions where these components are also subjected to a thermal treatment at an elevated temperature during a production process.

Although the coating exists in the form of tin and zinc mixed crystals, the electrical conductivity of this coating is not or is only insignificantly affected so a component which comprises this coating can also be used for electrical contacting. In particular, the component according to the invention can be a solid bolt.

The component according to the invention can also be welded to a body structure or a part of the body structure. For this purpose, the component has a weld-on part with at least one weld-on face. Even if the weld-on face comprises a coating containing tin and zinc mixed crystals, it has surprisingly been found that the coating does not affect the welding process or the strength of the welded joint because the material of the coating does not pass into the molten weld material. However, the coating is highly resistant to corrosion even though zinc is less noble than iron in the electrochemical series.

It has also surprisingly been found that the coating containing tin and zinc mixed crystals has very good sliding properties. As a result, the coefficient of friction of the coating is relatively low. It is therefore proposed in an advantageous embodiment of the component that the component is a joining part, in particular a rivet, preferably a punch rivet.

In particular for forming a punch riveted joint by means of a self-perforating semitubular rivet, it is proposed that the punch rivet has a connecting portion on which the coating is applied. This preferred embodiment of a joining part has the advantage that only low frictional forces occur between the parts to be joined and the semitubular rivet during expansion of the semitubular rivet so good expansion of the connecting portion of the semitubular rivet occurs. A further advantage of this embodiment of a component according to the invention resides in the fact that, owing to the relatively low frictional forces between the connecting portion of the rivet and the parts to be connected, deformation of a connecting part does not take place or only takes place to a very slight extent in the joining direction during the formation of a joint in the environment of the rivet, so a substantially uniform appearance is obtained in the environment.

The rivet is preferably provided with a complete coating so the risk of corrosion between the rivet and at least one connecting part is reduced.

According to a further advantageous embodiment of the component according to the invention, it is proposed that the coating be applied electro galvanically to the component. The component has a substantially uniformly applied coating.

According to a further advantageous embodiment of the component, it is proposed that it has at least one function carrier at least partially comprising a coating. The function carrier preferably comprises at least one fastening portion which is at least partially provided with the coating. Other parts can be connected on or to the function carrier of the component. In particular, a good electrical connection can be produced with the function carrier. The risk of corrosion is also avoided by the coating.

The fastening portion is preferably designed at least in part in the manner of a screw thread. In particular, the fastening portion designed in the manner of a screw thread is an external thread or an internal thread. Alternatively or additionally, the fastening portion can comprise at least one clamp or press face.

Since the coating is stable even at elevated temperatures, in particular at about 300° C., it is possible to arrange a further member or element, for example on the fastening portion, and to subject this unit to a thermal treatment. A member or element cannot be released non-destructively from a fastening portion of a component designed according to the state of the art as the fastening portion is changed due to the melting of the tin. In particular, if the fastening portion is designed in the manner of a screw thread, the tin melts in the case of components according to the state of the art and flows into screw threads so the member or element cannot be released non-destructively after solidification of the tin.

The coating preferably has a thickness between 2 and 20 $\mu$m. It is proposed, in particular, that the coating is about 8 $\mu$m.

Further details and advantages of the invention are described with reference to the embodiments illustrated in the drawings.

Figure 1:
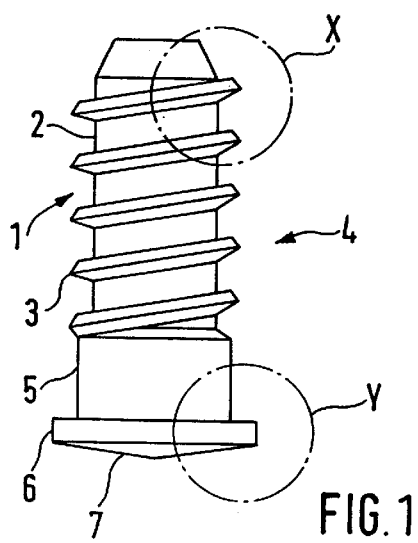
FIG. 1 shows a first embodiment of a component.

FIG. 1 shows a first embodiment of a component 1. The component 1 is a solid bolt. The component 1 comprises a shank 2 having a fastening portion 4. The fastening portion 4 is designed in the manner of a screw thread. It comprises an external thread 3. A head 5 adjoins the shank 2 with its external thread 3. The head 5 has a weld-on part 6 at its end region remote from the shank 2. The weld-on part 6 comprises a substantially conically shaped weld-on face 7.

Figure 2:
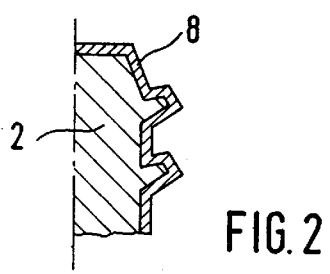
FIG. 2 shows a detail X of the component according to FIG. 1.
Figure 3:
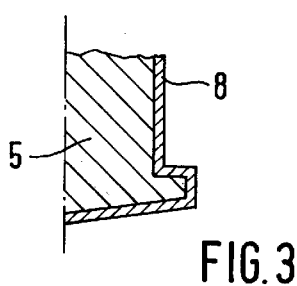
FIG. 3 shows a detail Y of the component according to FIG. 1.

In the embodiment illustrated, the component comprises a coating 8 comprising tin and zinc mixed crystals. The coating 8 is applied to the entire component 1 as shown, in particular, in FIGS. 2 and 3. The coating 8 preferably has a thickness between 2 and 20 $\mu$m, in particular of 8 $\mu$m.

Figure 4:
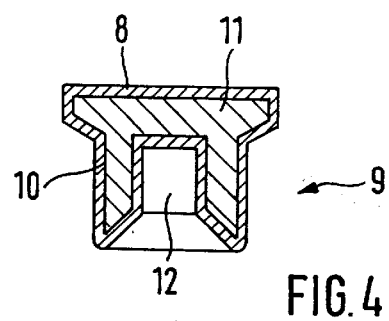
FIG. 4 shows a second embodiment of a component in a solid section.

FIG. 4 shows a second embodiment of a component 9. The component 9 is a semitubular rivet. The component 9 comprises a connecting portion 10 which is substantially tubular in design. The connecting portion 10 comprises an orifice 12. The free end of the connecting portion 10 is slightly conical in design so a peripheral cutting edge is formed. A rivet head 11 is connected to the connecting portion 10. The transition between the connecting portion 10 and the rivet head 11 is preferably rounded in design.

In the embodiment illustrated, the component 9 is provided with a complete coating 8. The coating 8 is preferably applied electro galvanically to the component.

Figure 5:
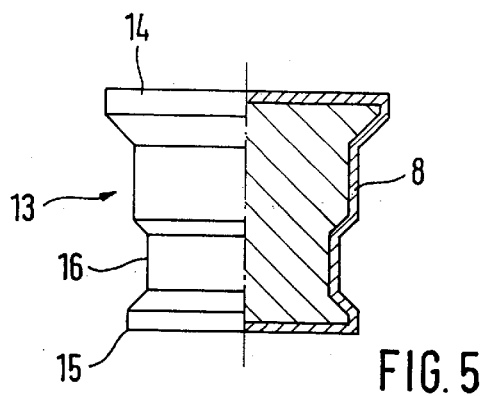
FIG. 5 shows a third embodiment of a component in a partial section.

FIG. 5 shows a third embodiment of a component 13. The component 13 is a punch rivet. The punch rivet is used to connect parts without preliminary perforation. The punch rivet comprises a set head 14. A cutting edge 15 is formed opposite the set head. The closing head 16 is formed above the cutting edge 15. In the illustrated embodiment, the component 13 has a coating 8. The coating 8 is applied over the entire surface of the component 13. A further embodiment of a component 17 is described hereinafter with reference to FIG. 6. The component 17 is designed in the form of a blind rivet nut. The component 17 comprises a set head 14 and a connecting portion 10 adjoining the set head 14. The connecting portion 10 comprises an internal thread 18.

The component 17 is completely coated with a coating 8. In particular, the internal thread 18 is also provided with tin and zinc mixed crystals containing the coating.

Figure 6:
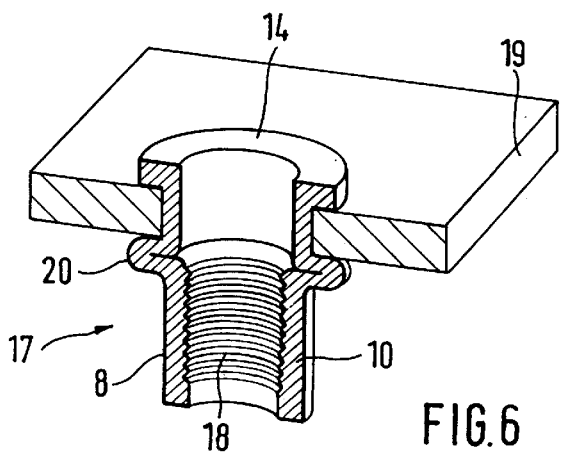
FIG. 6 shows a fourth embodiment of a component in a solid section.

FIG. 6 shows that the component 17 is secured on a structural part 19. The component 17 is screwed onto a pulling mandrel of a tool for assembly purposes. The screwed-on component 17 is introduced into an assembly orifice prefabricated in the structural part 19. The pulling mandrel is retracted by actuating a tool and a thread-free portion of the component 17 is radially upset to form a bead 20. The structural part is clamped between the set head 14 and the bead 20. The pulling mandrel is unscrewed from the component 17. The connecting portion 10 with the internal thread 18 represents a function carrier which is available for connection to a further element.

Figure 7:
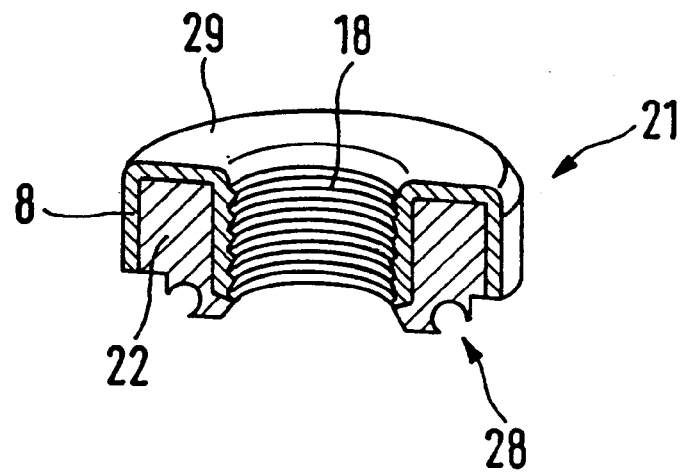
FIG. 7 shows a fifth embodiment of a component in a solid section.

FIG. 7 shows a component 21. The component 21 is a press-in or drive-in nut. The press-in nut is pressed into a previously perforated metal plate. For this purpose, the component 21 has a fastening region 28 which can be joined to a structural part, not shown. The component 21 comprises an internal thread 18.

The component 21 is formed by a nut body 22. The nut body is coated on the external surface and on the internal surface of the internal thread 18 with a coating 8 containing tin and zinc mixed crystals. The end face 29 of the nut body 22 remote from the fastening region 28 is provided with a coating 8.

Figure 8:
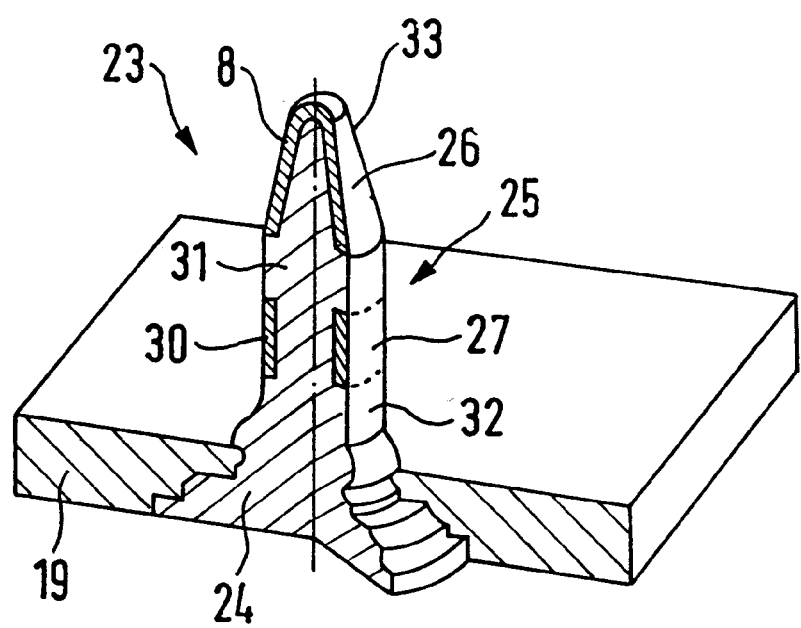
FIG. 8 shows a sixth embodiment of a component in section.

FIG. 8 shows a further example of a component 23. The component 23 comprises a function carrier 25. The function carrier 25 comprises two fastening portions 26, 27. The fastening portions 26, 27 extend in the axial direction of the component 23. The component 23 comprises a head 24 which is pressed into a structural part 19.

The fastening portion 27 is formed by a substantially cylindrical body 31 which directly adjoins the head 24 in the embodiment illustrated. The fastening portion 27 comprises a clamp face 32 on which a fastening member can be clamped. The fastening portion 27 comprises a coating 30 which merely extends over a proportion of the axial dimension of the fastening portion 27 in the embodiment illustrated. The coating 30 extends over the entire periphery of the body 31 in the fastening portion 27.

The fastening portion 27 is adjoined by a fastening portion 26 which is designed substantially as a conical joint. The fastening portion 26 comprises a press face 33. The entire fastening portion 26 is provided with a coating 8.

Preferred embodiments of the invention are shown in the drawings. Variations of the component are possible. The component according to the invention can also be used, in particular, in positions where thermal treatments of the component are carried out at an elevated temperature.

The coated fasteners of the invention are beneficially employed as fasteners of an automotive vehicle. In one preferred embodiment, the fastener of the invention may be a grounding member. In an automotive vehicle, one or more grounding members or grounding studs are attached to the frame and may be welded or otherwise bonded to the frame. Twenty to thirty grounding studs may be used in a typical automobile and it is preferred that each of these be coated with the tin and zinc layer according to the invention.

The coated metal fasteners of the invention are prepared by electrogalvanically coating a metal fastener with at least one layer or coating of a tin and zinc alloy. The tin is at least about 50% by weight of the alloy layer, more preferably at least about 60% by weight of the alloy layer, and even more preferably at least about 70% by weight of the alloy layer. The alloy layer may include up to about 90% by weight tin, and in one preferred embodiment the alloy layer includes from about 70% to about 90% by weight tin. The alloy or mixed crystal layer preferably has an average thickness of from about 2 to about 20 microns, and in a particularly preferred embodiment a layer with an average thickness of about 8 microns is used. When used herein, the term "thickness" refers to an average thickness of the coating or layer unless specifically indicated otherwise.

The galvanic coating is carried out in a plating bath. Preferred materials for forming the plating bath are available commercially from Schlötter Galvanotechnics under the tradename SLOTOLOY ZSN. In particular, SLOTOLOY ZSN 10 is a weakly acidic (pH of 3.8 to 4.2) electrolyte that can be used to apply the tin and zinc alloy coatings to the metal fasteners. In a preferred method of producing the coated metal fasteners, a plating bath is formed from SLOTOLOY ZSN 10, which contains ammonium salts, is combined The temperature of the bath is preferably kept at about 40° C. while the coating layer is deposited onto the metal fasteners. The deposition is carried out using tin anodes (at least 99.9% tine according to DIN 1704 Material NR. 2-3501) and fine zinc anodes (99.99% zinc according to DIN EN 29453). Amperage in the separate electrical circuits for the tin and zinc anodes is in a ratio appropriate to the electrolyte concentration and the desired alloy composition.

In a method according to the invention, an aqueous bath is provided that includes a SLOTOLOY ZSN material, preferably SLOTOLOY ZSN 10 or 11. The aqueous bath may include, and preferably does include, other ingredients, for example, without limitation, an acid such as boric acid, a tin salt, a zinc salt such as zinc chloride, SLOTOLOY ZSN 12, and, if desired, a gloss additive such as SLOTOLOY ZSN 13.

EXAMPLE

A 100 liter drum bath is prepared by adding first 30 liters of water to the container and then carefully adding 50 kg beginning concentrate SLOTOLOY ZSN 11 (available form Schlötter Galvanotechnics, Germany) and heating the mixture to 40° C. To the mixture is added 3 kg boric acid, 3.13 kg tin concentrate FS, 3.3 kg zinc chloride, 4.32 kg basic addition SLOTOLOY ZSN 12, and 0.05 kg gloss addition SLOTOLOY ZSN 13. Additional water is added as needed to total 100 liters of bath.

A metal fastener is submerged in the bath and connected as the cathode and a potential of electric current is applied to cause tin and zinc to deposit as mixed crystals on the metal fastener to an average layer thickness of about 8 microns. The mixed crystals of the deposited layer are about 70% by weight tin and about 30% by weight zinc.

The fasteners of the invention, including rivets, screw threaded fasteners, bolts, clamps, and fasteners with press faces, are useful for joining two metal members. In particular, the fasteners are advantageous when two dissimilar metals are brought into contact. The fasteners of the invention improve resistance to the galvanic corrosion, which is due to the electromotive potential between the different metals, that would typically take place. Galvanic corrosion has been a persistent problem on automotive vehicles around rivets or other fasteners that join two members of different metals, such as a member including aluminum and a member including steel. The steel may be galvanized or have another coating, such as a phosphate treatment. Over time, the corrosion may undercut the painted surface causing delamination of the coating and thus further corrosion. In the methods and articles of the present invention, the layer of tin and zinc mixed crystals plated on the fasteners markedly increases resistance of the joint to galvanic corrosion.

The invention has been described in detail with reference to preferred embodiments thereof. It should be understood, however, that variations and modifications can be made within the spirit and scope of the invention and of the following claims.

What is claimed is:

1. A coated metal fastener prepared by a process comprising steps of:

(a) providing an aqueous bath comprising an electrolyte electrogalvanically depositing a tin and zinc alloy coating;

(b) submerging a metal fastener in the aqueous bath; and (c) applying a potential of electric current between at least one anode and the fastener to deposit a layer of an alloy of tin and zinc to at least a part of at least one function carrier, wherein the tin is from about 50 to about 90% by weight of the alloy.

2. A fastener according to claim 1, wherein said layer deposited is from about 2 to about 20 microns thick.

3. A fastener according to claim 1, wherein said layer deposited is about 8 microns thick.

4. A coated metal fastener according to claim 1, wherein said fastener is a solid bolt.

5. A coated metal fastener according to claim 1, wherein said fastener has a weld-on part with at least one weld-on face.

6. A coated metal fastener according to claim 1, wherein said fastener is a rivet.

7. A coated metal fastener according to claim 1, wherein said fastener is a punch rivet.

8. A coated metal fastener according to claim 1, wherein said fastener is a semitubular rivet.

9. A coated metal fastener according to claim 1, wherein the fastener is substantially completely coated.

10. A coated metal fastener according to claim 1, wherein the one function carrier comprising a fastening portion which is at least partially coated with the layer of the alloy.

11. A coated metal fastener according to claim 1, wherein the fastener further comprises an electrical connection.

12. A coated metal fastener according to claim 10, wherein said fastening portion comprises a screw thread.

13. A coated metal fastener according to claim 12, wherein said screw thread is an external screw thread.

14. A coated metal fastener according to claim 12, wherein said screw thread is an internal screw thread.

15. A coated metal fastener according to claim 10, wherein said fastening portion comprises at least one clamp.

16. A coated metal fastener according to claim 10, wherein said fastening portion comprises at least one press face.

17. A coated metal fastener according to claim 1, wherein said fastener is a blind rivet nut.

18. A coated metal fastener according to claim 1, wherein said fastener is a press-in or drive-in nut.

19. A coated metal fastener according to claim 1, wherein said fastener comprises a function carrier comprising at least two fastening portions, and further wherein a layer of an alloy of tin and zinc is deposited on at least a part of each of said fastening portions.

20. A coated metal fastener according to claim 1, wherein said fastener is a stud.

21. An automotive vehicle comprising at least one coated metal fastener prepared by a process comprising steps of:

(a) providing an aqueous bath comprising an electrolyte material for electrogalvanically depositing a tin and zinc alloy coating;

(b) submerging a metal fastener in the aqueous bath; and (c) applying a potential of electric current between at least one anode and the fastener to deposit a layer of an alloy of tin and zinc to at least a part of at least one function carrier, wherein the tin is from about 50 to about 90% by weight of the alloy.

* * * * *